Sept. 27, 1966   L. R. RUBIN   3,274,754
GAS PURIFICATION APPARATUS
Filed Jan. 17, 1964
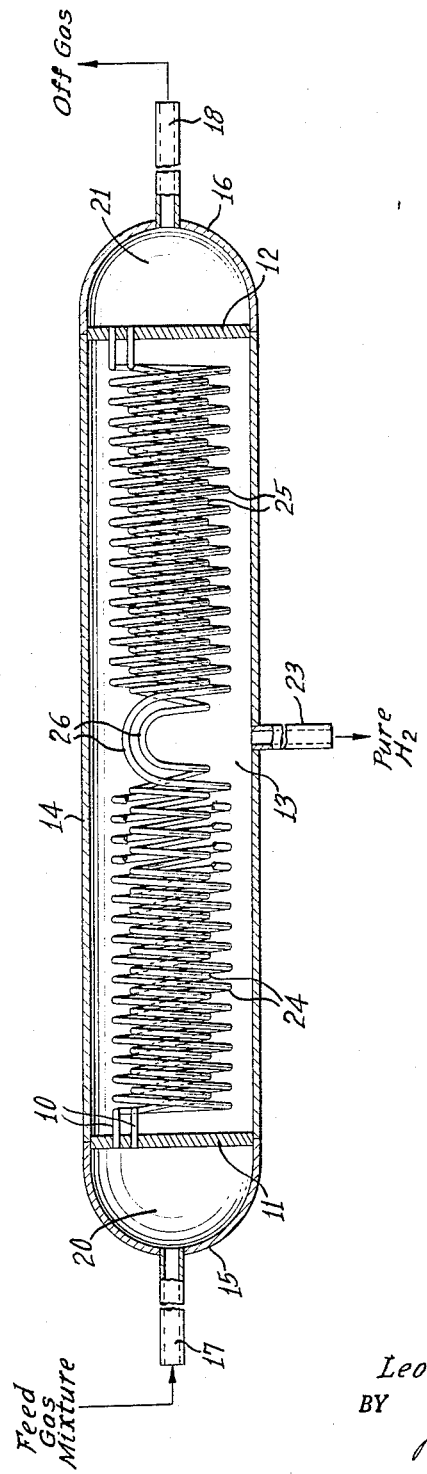
INVENTOR.
Leonard R. Rubin
BY
John K. Conant
ATTORNEY 3,274,754
GAS PURIFICATION APPARATUS
Leonard R. Rubin, Union, N.J., assignor to Engelhard Industries, Inc., Newark, N.J., a corporation of Delaware
Filed Jan. 17, 1964, Ser. No. 338,328
5 Claims. (Cl. 55—158)

The present invention relates to apparatus for purifying gases such as hydrogen and oxygen and relates particularly to a novel construction for purification apparatus of the type in which the gas is purified by permeation of the gas through the walls of a metal tube or tubes.

It is a well-known phenomenon that certain gases such as oxygen and hydrogen permeate and diffuse through certain metals. For example oxygen diffuses through silver and hydrogen will diffuse through palladium and palladium alloys such as palladium-silver, palladium-boron, palladium-gold. A particularly suitable alloy for hydrogen diffusion is 75% palladium and 25% silver by weight.

This phenomenon is made use of in apparatus for purifying gases such as hydrogen or oxygen by bringing a gas mixture containing the gas to be purified into contact under heat and pressure with a thin non-porous wall of the metal through which the gas to be separated from the mixture will diffuse.

The present invention relates to diffusion purification apparatus in which the gas permeable metal walls are provided in the form of tubes and the invention is particularly adapted for apparatus of the "in-out" type which is explained in more detail below. For convenience, the apparatus in accordance with the invention will be described with reference to apparatus having palladium alloy tubes for the purification of hydrogen. It is to be understood, however, that the diffusion tubes may be made of other metals for purifying hydrogen or other gases without departing from the spirit and scope of the present invention.

Purification apparatus utilizing tubes of gas permeable metal are ordinarily one of two general types—the "in-out" type and the "out-in" type. In both, the diffusion tube (or tubes) extends into a chamber with the bore of the tube sealed from the chamber. In the "in-out" type impure feed gas containing hydrogen is fed into the bore of the tube under pressure and the hydrogen diffuses out through the walls of the tube into the chamber. In the "out-in" type the diffusion is in the opposite direction. The feed gas is fed into the chamber under pressure and the hydrogen diffuses into the bore of the tube.

The rate of diffusion is increased to a commercially practical level by heating the diffusion tubes and the feed gas brought in contact therewith and by creating a pressure differential between the inside and outside of the tubes.

A tube will normally withstand a greater internal than external pressure. "In-out" diffusion apparatus in which the greater pressure is applied inside the diffusion tubes may therefore be operated at a higher pressure differential and hence purify a larger volume of hydrogen per unit of tube surface during a given time at a given temperature than "out-in" apparatus in which the greater pressure is on the outside of the tubes.

In conventional "in-out" apparatus however each tube is normally secured and sealed through the walls of the chamber at two points—ordinarily at opposite ends of the chamber—since both ends of each tube open outside the chamber for feed gas containing hydrogen to be fed in one end and undiffused gas to flow out the other. In some apparatus the tube is in the form of coils in the chamber to increase the amount of tubing, and hence the effective diffusion surface, within the chamber. In this case the pressurized gas in the coils exerts a Bourdon tube effect. That is the gas in the tube exerts pressure on the coils which tends to uncoil and straighten the coils. This results in severe torsional stress on the seals in apparatus of conventional design.

It is a principal object of the present invention to provide a novel construction for "in-out" type purification apparatus in which the severe stress applying to the seals around the diffusion tubes in conventional "in-out" apparatus is greatly reduced.

In accordance with the invention the diffusion tube extends through a collecting chamber for the purified gas and the tube is sealed and secured through two opposite end walls of the chamber so as to open outside the chamber as in conventional diffusion purification apparatus. However, in accordance with the invention one portion of the tube within the chamber is coiled in one direction and another portion is coiled in the opposite direction.

With this configuration the Bourdon effect of pressure in the tube and longitudinal expansion of the tube is relieved without applying torsional and longitudinal stress on the seals. X-rays of apparatus of this invention confirm that in operation the two oppositely coiled portions of the tube unwind in the same direction at the point at which they join. In effect the coils unravel and thereby relieve the stress which otherwise would be applied at the points at which the ends of the tube are secured through the chamber walls.

Apparatus in accordance with the present invention may have a single diffusion tube through the collecting chamber or a plurality of such tubes.

Further objects and advantages of the diffusion purification apparatus of this invention will be apparent from the following detailed description with reference to the accompanying drawing which is a side view of a longitudinal section through a hydrogen purification apparatus in accordance with the present invention and showing the apparatus partly in section and partly in elevation.

Referring to the drawing the gas purification apparatus of this invention comprises generally one or more metal diffusion tubes 10 supported between a pair of end walls 11 and 12 of a collecting chamber 13. The chamber 13 is formed by a cylindrical shell 14 and the end walls 11 and 12 which are attached across the shell by welding or other conventional means. An outlet tube 23 secured through the shell 14 provides an outlet for purified hydrogen from the chamber 13.

End caps 15 and 16 are attached over the ends of the shell 14 with an inlet tube 17 fixed through the end cap 15 and an outlet tube 18 fixed through the end cap 16. The end cap 15 thus provides an inlet chamber 20 between the cap 15 and the end wall 11 while the end cap 16 forms an outlet chamber 21 between the cap 16 and end wall 12. The shell 14, end walls 11 and 12, end caps 15 and 16 and tubes 17, 18 and 23 may suitably be made of stainless steel. The diffusion tube or tubes 10 are formed of a metal alloy, such as palladium-silver which hydrogen will permeate and diffuse through. The tubes 10 extend through the collecting chamber 13 and are secured and sealed through the end walls 11 and 12 by welding or brazing or other conventional means. The tubes 10 thus open respectively into the inlet chamber 20 and outlet chamber 21 and the bores of the tube 10 are sealed from the collection chamber 13.

In accordance with the invention two portions of each diffusion tube 10 within the collecting chamber 13 are spirally coiled in opposite directions. As shown, coils 24 in one portion of each tube 10 are spirally coiled in one direction and coils 25 in the other portion are spirally coiled in the opposite direction. The two portions are joined by an arcuately curved section 26. With this arrangement the coils 24 and 25 are free to unwind when heat and pressure are applied during operation of the apparatus and the unwinding thereby relieves the torsional and longitudinal stress which would otherwise apply to the seals of the tubes 10 through the walls 11 and 12.

In operation a feed gas mixture containing hydrogen is fed under pressure through the inlet tube 17 into the inlet chamber 20 from which it flows into the diffusion tubes 10. As the feed gas mixture progresses through the diffusion tubes 10 pure hydrogen permeates and diffuses through the walls of the tube into the collecting chamber 13 from which it flows out the outlet tube 22 to suitable storage facilities or to the point of use.

The off gas from which hydrogen has diffused into the collecting chamber 13 continues through the tubes 10 and into the outlet chamber 21 from which it flows out of the apparatus through the outlet tube 18.

As previously mentioned, heat is usually applied to facilitate the diffusion. The desired heat may be applied to the apparatus by wrapping electric resistance wires (not shown) around the shell 14 adjacent the collecting chamber 13 or by applying a gas flame to the shell 14 or by any other convenient means.

It will be appreciated that certain modifications may be made in the structure and arrangement described above without departing from the spirit or scope of the invention defined in the following claims.

What is claimed is:

1. Apparatus for diffusion purification of a gas comprising a chamber having two end walls and an outlet, and a diffusion tube having a wall of non-porous metal through which particular gas permeates, said tube wall being adapted to selectively permeate said particular gas through said tube wall, extending through the chamber and being secured through the two end walls and opening outside the chamber, said tube having one portion within the chamber spirally coiled in one direction and another portion within the chamber spirally coiled in the opposite direction.

2. Apparatus as set forth in claim 1 in which said tube is made of hydrogen permeable metal.

3. Apparatus for diffusion purification of a gas comprising a generally cylindrical shell, a pair of end walls secured respectively across opposite ends of the shell forming a collecting chamber in the shell, an outlet from the collecting chamber, caps over the opposite ends of the shell forming respectively an inlet chamber adjacent the collecting chamber at one end of the shell and an outlet chamber adjacent the collecting chamber at the opposite end of the shell, an inlet for a gas into the inlet chamber, an outlet for a gas from the outlet chamber, and at least one diffusion tube having a wall of non-porous metal through which a particular gas permeates, said tube wall being adapted to selectively permeate said particular gas through said tube wall, extending through the collecting chamber, said tube being secured through the end walls with the ends of the tube opening respectively into the inlet chamber and the outlet chamber, said tube having one portion within the collecting chamber spirally coiled in one direction and another portion within the chamber spirally coiled in the opposite direction.

4. Apparatus as set forth in claim 3 including a plurality of tubes with the spirally coiled portions of one tube concentrically arranged with respect the coils of the other tubes.

5. Apparatus as set forth in claim 4 in which said tubes are made of hydrogen permeable metal.

References Cited by the Examiner
UNITED STATES PATENTS

| | | | |
|---|---|---|---|
| 2,536,610 | 1/1951 | King et al. | 55—158 |
| 2,911,057 | 11/1959 | Green et al. | 55—158 |

REUBEN FRIEDMAN, *Primary Examiner.*

J. ADEE, *Assistant Examiner.*